No. 608,495. Patented Aug. 2, 1898.
C. V. WALTER.
FASTENER.
(Application filed Oct. 8, 1897.)
(No Model.)
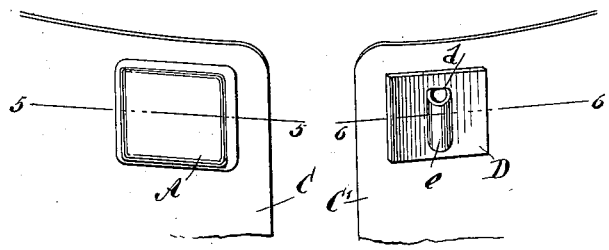
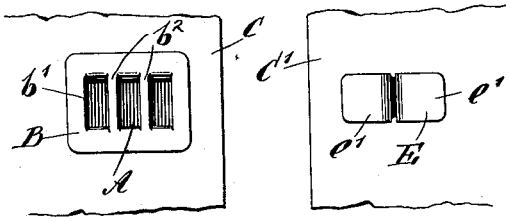
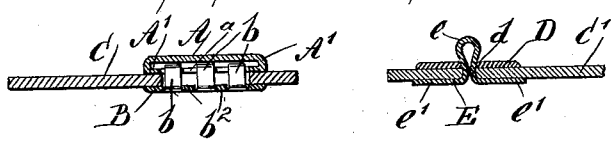
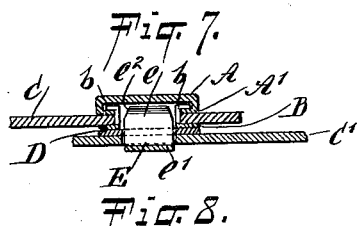
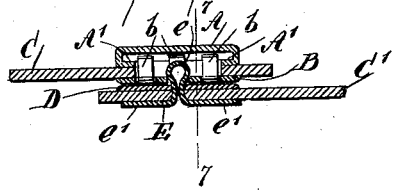
WITNESSES:
William P. Gaebel.
H. L. Reynolds.
INVENTOR
C. V. Walter.
BY
ATTORNEYS.
THE NORRIS PETERS CO., PHOTO-LITHO., WASHINGTON, D. C.

UNITED STATES PATENT OFFICE.

CHARLES V. WALTER, OF NEW YORK, N. Y.

FASTENER.

SPECIFICATION forming part of Letters Patent No. 608,495, dated August 2, 1898.

Application filed October 8, 1897. Serial No. 654,537. (No model.)

*To all whom it may concern:*

Be it known that I, CHARLES V. WALTER, of New York, (Brooklyn,) in the county of Kings and State of New York, have invented a new and Improved Fastener, of which the following is a full, clear, and exact description.

My invention relates to an improvement in fasteners adapted particularly for use in securing gloves and similar articles, but adapted as well to secure any article having flaps which overlap.

The invention consists of the novel construction which will be hereinafter described, and particularly pointed out in the claims.

Reference is to be had to the accompanying drawings, forming a part of this specification, in which similer characters of reference indicate corresponding parts in all the figures.

Figure 1 is a front view of the socket member. Fig. 2 is a similar view of the stud member. Fig. 3 is a rear view of the socket member. Fig. 4 is a similar view of the stud member. Fig. 5 is a sectional view on the line 5 5 in Fig. 1. Fig. 6 is a sectional view on the line 6 6 in Fig. 2. Fig. 7 is a cross-sectional view on the line 7 7 in Fig. 8. Fig. 8 is a sectional view on lines corresponding to lines 5 5 and 6 6 in Figs. 1 and 2, showing the members of the fastener interlocked; and Fig. 9 is an inverted plan view of the socket member of the fastener.

My device comprises, as is usual with such fasteners, two parts, a socket member and a stud member, each of which members is fastened to its particular flap, and by engaging one with the other the two flaps of the article to which the fastener is applied are secured together.

The socket member consists of two parts, a plate A, which has its edges turned downward and under, forming a flange A', extending about all four sides thereof. This flange A' is preferably provided with small projections $a$ upon the longer sides thereof. The projections serve to securely lock the tongues upon the plate B, forming the other part of the socket member, and thereby prevent any longitudinal movement of one part relatively to the other. While these projections $a$, which are designed to engage the tongues $b$ upon the plate B, are desirable, they are not strictly essential. While the drawings show the outer boundaries of the plate A as being rectangular, it is obvious that it may be made of a round outline or of any other shape in which it is customary to form metal buttons or similar articles. The side edges of the flanges should, however, be parallel.

The plate B, which combined with the plate A forms the socket member, consists of a thin metal plate having a series of rectangular apertures $b'$ formed therein by punching out the metal within the borders of the apertures. I have herein shown three such apertures; but this number may be varied. The metal is not entirely punched away, but is left attached to the plate at each end and forms the tongues $b$, which are bent over so as to clasp the flange A' of the plate A and secure the socket member to the flap C of the article to be fastened. These tongues $b$ are securely bent down upon the flange A' and engage with the projections $a$, thus securely holding the two parts of the socket member together. Between the apertures $b'$ in the plate B are left narrow bands $b^2$.

The stud member consists of two plates D and E. The plate D is a plain plate or washer, which, as shown, is of a rectangular form, but may be made of any desired form, and has a narrow slot or aperture $d$ extending across the same at or near its center. The plate E is bent upon itself at its center, forming a loop $e$, which in its completed form resembles in cross-section a bulb having a circular outline. The ends of the plate E are inserted in the slot $d$ and through a corresponding slot in the flap C' and are then bent down upon the flap, forming the binding-tongues $e'$. The stud thus formed projects beyond the plate D and is of such a size as to snugly fit within the apertures $b'$ in the part $b$ of the socket member. The stud or loop $e$ should project beyond the plate A to such a distance that the plate B will engage its side surface below the center of the bulb forming the stud. The upper end surfaces of the stud $e$ may, if desired, be beveled, as shown at $e^2$ in Fig. 7. This beveling assists somewhat in quickly entering the stud within the aperture in the socket member. This bevel, however, is not an essential feature and may be omitted, if desired.

This form of fastener, it will be seen, is composed of only four pieces, which are of such a form as to be simply and cheaply manufactured, and is also of such a nature that it is not confined to a single adjustment, but may have the stud inserted in any one of the apertures $b'$ in the socket member. This obviates an objection which is inherent to the majority of socket-and-stud fasteners—namely, that they permit no variation of adjustment.

This fastener is one which may be adapted for use upon shoes, as it permits adjustment of the flaps of the shoe and will thus enable the shoe to be fastened a little tighter as the leather stretches and becomes loose. It also permits of the fastener being attached to the shoe at the factory in such position that it will fit the majority of feet when the stud or loop $e$ is inserted in one or the other of the apertures $b'$ in the socket member. The fastener is especially adapted for all purposes of this nature where an adjustment in the fastening position is desired.

Having thus fully described my invention, I claim as new and desire to secure by Letters Patent—

1. A fastener, consisting of stud and socket members, the socket member comprising a plate having its edges flanged or curved inward and under, and a plate having a series of rectangular apertures disposed along the line of strain, and having projections on the body thereof at opposite side edges of the apertures and bent over so as to clasp and hold the stock and the inwardly-flanged edges of the other plate, and the stud member having a side projecting portion adapted to enter said apertures, substantially as described.

2. A fastener, consisting of stud and socket members, the socket member comprising a plate having its edges flanged or curved inward and under, and provided with binding-notches, and a plate having a series of rectangular apertures arranged in the line of strain, and having projections on the body thereof at opposite side edges of the apertures and bent over so as to clasp and hold the fabric and the inwardly-flanged edges of the other plate, said projections registering with and entering the notches in said flange, and the stud member having a side projecting portion adapted to enter said apertures, substantially as described.

3. A fastener, consisting of stud and socket members, the socket member comprising a plate having its edges flanged or curved inward and under, and a plate having a series of rectangular apertures arranged in the line of strain and having fastening projections on the body thereof at opposite side edges of the apertures and bent over so as to clasp and hold the fabric and the inwardly-flanged edges of the other plate, and the stud member comprising a plate having a narrow slot or elongated aperture therein, and the stud consisting of a plate bent centrally upon itself so as to form a bulb at the bend, the ends of the plate being inserted through said slot and the material, and then bent outwardly and down upon the material, substantially as described.

4. The socket member of a stud-and-socket fastener, comprising a plate having its edges flanged or curved inward and under, and a plate having a series of apertures disposed along the line of strain, and having tongues attached to the body of the plate at opposite sides of the apertures, said tongues being bent over so as to clasp and hold the fabric and the inwardly-flanged edges of the other plates.

CHARLES V. WALTER.

Witnesses:
EVERARD BOLTON MARSHALL,
H. L. REYNOLDS.